United States Patent
Koeneman

(10) Patent No.: US 7,168,680 B2
(45) Date of Patent: Jan. 30, 2007

(54) EMBEDDED CONTROL VALVE USING ELECTROACTIVE MATERIAL

(75) Inventor: Paul B. Koeneman, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 86 days.

(21) Appl. No.: 10/896,652

(22) Filed: Jul. 22, 2004

(65) Prior Publication Data
US 2006/0017030 A1    Jan. 26, 2006

(51) Int. Cl.
*F16K 31/02* (2006.01)
(52) U.S. Cl. .................................. 251/129.06
(58) Field of Classification Search ............ 251/129.06
See application file for complete search history.

(56) References Cited

U.S. PATENT DOCUMENTS

| | | | |
|---|---|---|---|
| 4,842,017 A * | 6/1989 | Reynolds | 137/601.04 |
| 5,267,589 A | 12/1993 | Watanabe | |
| 5,723,784 A * | 3/1998 | Lembke et al. | 73/204.26 |
| 5,819,749 A * | 10/1998 | Lee et al. | 128/899 |
| 6,406,605 B1 * | 6/2002 | Moles | 251/129.06 |
| 6,490,483 B2 | 12/2002 | Willis | |
| 6,505,811 B1 | 1/2003 | Barron et al. | |
| 6,532,392 B1 * | 3/2003 | Eryurek et al. | 700/54 |
| 6,561,208 B1 | 5/2003 | O'Connor et al. | |
| 6,830,071 B2 * | 12/2004 | Xu et al. | 137/625.33 |
| 6,992,550 B2 * | 1/2006 | Rawnick et al. | 333/263 |
| 6,994,314 B2 * | 2/2006 | Garnier et al. | 251/129.06 |
| 2003/0068264 A1 * | 4/2003 | Schmidt et al. | 423/237 |
| 2004/0108479 A1 * | 6/2004 | Garnier et al. | 251/129.01 |
| 2005/0211973 A1 * | 9/2005 | Mori et al. | 257/40 |

OTHER PUBLICATIONS

Murthy, N.S, et al., Effect of charge transfer on chain dimension in trans-polyacetylene; J. Chem. Phys, Aug. 15, 1987; pp. 2346-2348.
Product Profile; CF19-2186; Medium Cure Rate, General Purpose Silicone Elastomer, NuSil Technology, Carpinteria, CA, Feb. 6, 2004.

* cited by examiner

*Primary Examiner*—Justine R. Yu
*Assistant Examiner*—Andrew J. Rost
(74) *Attorney, Agent, or Firm*—Sacco & Associates, PA; Robert J. Sacco

(57) ABSTRACT

A microfluidic control valve (100) comprising a dielectric structure (105) defining at least one cavity (260) therein. An electroactive material (305), such as an electroactive polymer, is disposed in a portion of the cavity. The electroactive material is operable between a first state in which a dimension of the electroactive material has a first value and a second state in which the dimension has a second value. Two conductors (240, 250) can be included for applying a voltage potential across the electroactive material to change the electroactive material between the first state and the second state. A first fluidic port (310) can be located proximate to the electroactive material such that a fluid flows through the first fluidic port when the electroactive material is in the first state, and the electroactive material at least partially blocks the first fluidic port when the electroactive material is in the second state.

13 Claims, 4 Drawing Sheets

EMBEDDED CONTROL VALVE USING ELECTROACTIVE MATERIAL

BACKGROUND OF THE INVENTION

1. Statement of the Technical Field

The inventive arrangements relate generally to the field of micro devices, and more particularly to microfluidic control systems.

2. Description of the Related Art

Miniaturization of various devices which incorporate fluidic systems has spurred a need for fluidic systems having very small components. These systems are commonly known as microfluidic systems. Microfluidic systems have the potential to play an increasingly important role in many developing technology areas. For example, there has been an increasing interest in recent years in the use of liquid fuels in microengines and for the use of fluid dielectrics in electronics systems.

Another technological field where micro-fluidic systems are likely to play an increasingly important role is fuel cells. Fuel cells generate electricity and heat by electrochemically combining a fuel and an oxidant with an ion-conducting electrolyte. Some types of fuel cells produce waste water as a byproduct of the reaction. This waste water must be transported away from the reaction to be exhausted from the system by a fluid management sub-system.

Efforts are currently under way to create very small fuel cells, called microcells. It is anticipated that such microcells may eventually be adapted for use in many portable electronics applications. For example, such devices could be used for powering laptop computers and cell phones. Still, microcells present a number of design challenges that will need to be overcome before these devices can be practically implemented. For example, miniaturized electromechanical systems must be developed for controlling the fuel cell reaction, delivering fuel to the reactive components and disposing of water produced in the reaction. In this regard, innovations in fuel cell designs are beginning to look to silicon processing and other techniques from the fields of microelectronics and micro-systems engineering.

As with most other types of fluidic systems, microfluidic systems usually incorporate control valve devices that are implemented as discrete components. Discrete components tend to be bulky, however, which oftentimes impedes miniaturization efforts. Moreover, such control valve devices typically include pluralities of moving parts that must interoperate. The reliability of such devices, however, is generally inversely proportional to the number of moving parts since the moving parts tend to wear. Hence, an embedded control valve that can overcome the aforementioned limitations is needed for use in microfluidic systems.

SUMMARY OF THE INVENTION

The present invention relates to a microfluidic control valve comprising a dielectric structure defining at least one cavity therein. An electroactive material, such as an electroactive polymer, can be disposed in a portion of the cavity. The electroactive material is operable between a first state in which a dimension of the electroactive material has a first value and a second state in which the dimension has a second value. At least two conductors can be included for applying a voltage potential across the electroactive material. The application of the voltage potential can change the electroactive material between the first state and the second state.

A first fluidic port can be located proximate to the electroactive material such that a fluid flows through the first fluidic port when the electroactive material is in the first state, and the electroactive material at least partially blocks the first fluidic port when the electroactive material is in the second state, thereby reducing or stopping the fluid flow. A second fluidic port can be fluidically coupled to the first fluidic port when the electroactive material is in the first state. A closed loop control circuit can determine an appropriate amount of voltage to apply to the electroactive material. The closed loop control circuit can include an optical sensor, a fluid flow sensor or an electrical current sensor.

A method for controlling a fluid flow can include flowing a fluid through a fluid port defining a cross-sectional area and selectively varying an electric field applied to an electroactive material in response to a control signal to produce a change in the cross-sectional area. The method also can include selectively varying the electric field responsive to a measured fluid flow, a measured electric field intensity, or a measured change in shape of the electroactive material.

A method of fabricating the microfluidic control valve can include forming at least one cavity in a dielectric structure and disposing an electroactive material, such as an electroactive polymer, in a portion of the cavity. The electroactive material can be operable between a first state in which a dimension of the electroactive material has a first value and a second state in which the dimension has a second value. A first conductor can be disposed on a first side of the electroactive material and a second conductor disposed on a second side of the electroactive material such that a voltage applied across the first and second conductors is applied across the electroactive material, thereby changing the electroactive material between the first state and the second state.

A first fluidic port can be provided proximate to the electroactive material such that a fluid flows through the first fluidic port when the electroactive material is in the first state, and the electroactive material at least partially blocks the first fluidic port when the electroactive material is in the second state, thereby reducing or stopping the fluid flow. A second fluidic port can be fluidically coupled to the first fluidic port when the electroactive material is in the first state. A closed loop control circuit can be included to determine an appropriate amount of voltage to apply to the electroactive material. The control circuit further can include an optical sensor, a fluid flow sensor or an electrical current sensor.

DETAILED DESCRIPTION OF THE PREFERRED EMBODIMENTS

The present invention relates to a microfluidic control valve (control valve). The control valve can be used in microfluidic systems to control a fluid flow rate, as well as to turn on and turn off fluid flow. Importantly, the control valve can be embedded in a substrate containing a fluid flow channel through which the fluid flows. The control valve can include an electroactive material that restricts the fluid flow by expanding over a fluid port when an electric field is applied to the electroactive material. Alternatively, the electroactive material can extend over the fluid port, thereby blocking the fluid port, when there is little or no electric field applied, but constrict in the presence of an electric field to unblock the fluid port and allow fluid flow.

In one arrangement, the electroactive material can be the only moving component within the control valve. Accordingly, the profile of the microfluidic system is smaller in comparison to fluidic systems using discrete components. Additionally, this embodiment minimizes a number of fluidic seals in the microfluidic system, thereby making the microfluidic system more robust in comparison to other fluidic systems.

The control valve can be a stand alone device or can be advantageously integrated with a larger system on the substrate. Examples of such larger systems can include fuel cells, micro-motors, and other MEMS type devices. Other examples can include fluid dielectric based devices in the RF field such as antenna elements, matching sections, delay lines, beam steering elements, tunable transmission lines, stubs and filters, variable attenuators, and cavity structures. Nonetheless, the invention is not limited to any particular type of device.

Figure 1A:
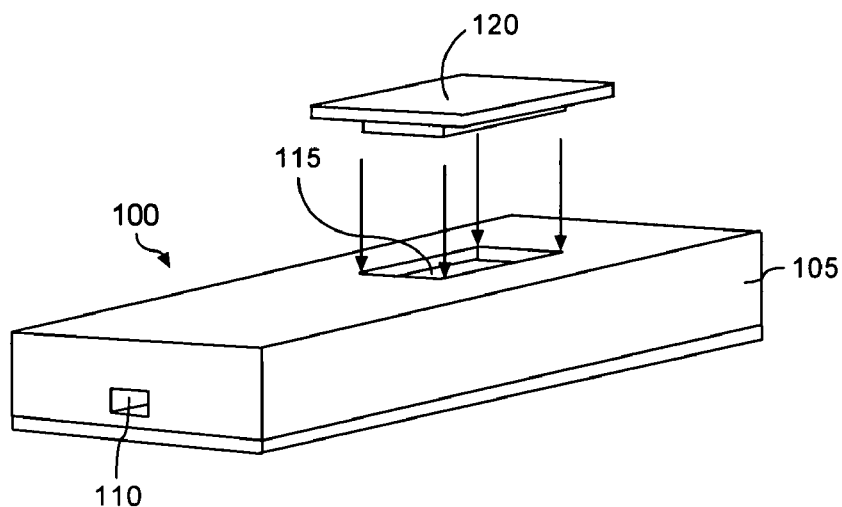
FIGS. 1A and 1B are perspective views of a microfluidic control valve that is useful for understanding the present invention.
Figure 1B:
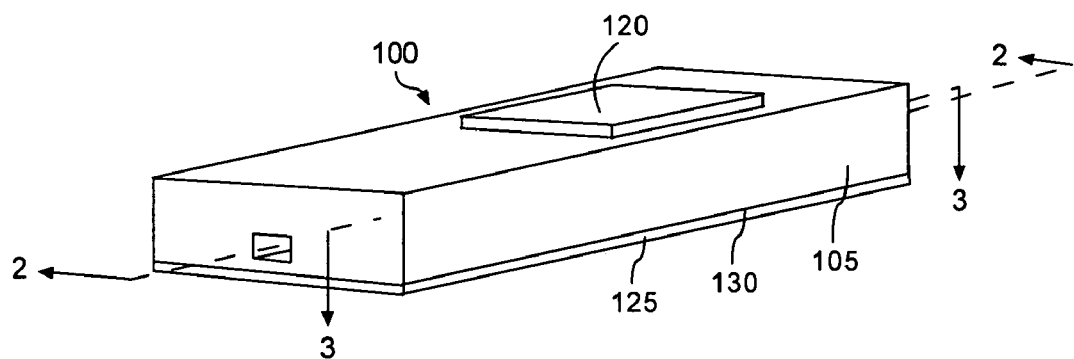

A control valve 100 in accordance with the present invention is shown in FIG. 1A. The control valve 100 can be manufactured on any of a variety of substrates. For example, the control valve 100 can be manufactured on a substrate 105 made of ceramic, liquid crystal polymer (LCP), silicon, gallium arsenide, gallium nitride, germanium or indium phosphide. Still, the invention is not so limited and any substrate material suitable for a micro-electromechanical manufacturing process can be used. The control valve can include a fluid channel 110 and an access port 115 defined within the substrate 105. The access port 115 can provide access to a cavity defined within the substrate 105 wherein the electroactive material is disposed. A cap 120 can be provided to close the access port 115, as shown in FIG. 1B.

In some instances, it can also be desirable to include a conductive ground plane 125 on at least one side 130 of the substrate 105. For example, the ground plane 125 can be used in those instances where RF circuitry is formed on the surface of the substrate 105. The conductive ground plane 125 also can be used for shielding components from exposure to RF and for a wide variety of other purposes. The conductive metal ground plane can be formed of a conductive metal that is compatible with the substrate 105. Those skilled in the art, however, will appreciate that the ground plane is not required for the purposes of the invention.

One type of LCP material that can be used for the formation of the substrate 105 is R/flex® 3000 Series LCP Circuit Material available from Rogers Corporation of Rogers, Conn. The R/flex® 3000 LCP has a low loss tangent, low moisture absorption, and maintains stable electrical, mechanical and dimensional properties. The R/flex® 3000 LCP is available in a standard thickness of 50 μm, but can be provided in other thicknesses as well.

One type of ceramic material that can be used for the formation of the substrate is low temperature 951 co-fire Green Tape™ from Dupont® . The 951 co-fire Green Tape™ is Au and Ag compatible, and has acceptable mechanical properties with regard to thermal coefficient of expansion (TCE) and relative strength. It is available in thicknesses ranging from 114 μm to 254 μm. Other similar types of systems include a material known as CT2000 from W. C. Heraeus GmbH, and A6S type LTCC from Ferro Electronic Materials of Vista, Calif. Any of these materials, as well as a variety of other LTCC materials with varying electrical properties can be used.

Figure 2:
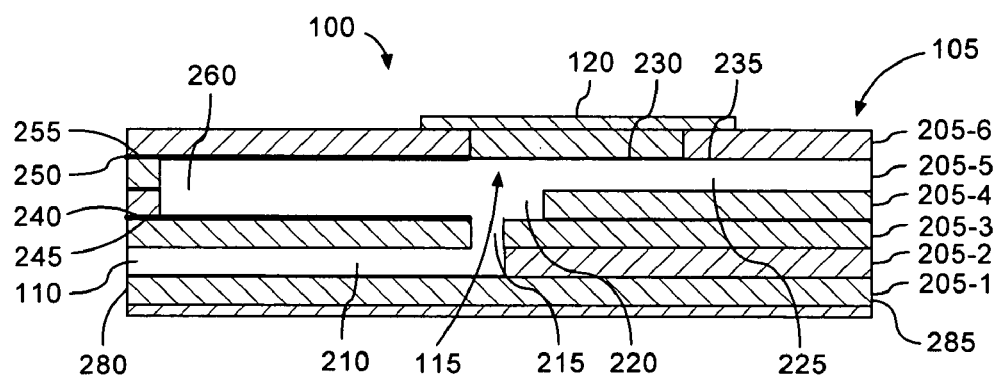
FIG. 2 is a section view, taken along section line 2—2, of the microfluidic control valve of FIG. 1 prior to the addition of an electroactive material to the valve.

A section view of the control valve taken along section line 2—2 is shown in FIG. 2. As shown, the substrate can be formed from a plurality of substrate layers 205. For example, substrate layers 205-1, 205-2, 205-3, 205-4, 205-5, 205-6 can be provided. Notably, each of the substrate layers 205 can further comprise multiple sub layers which have been stacked to form each layer.

The substrate material that is to be used in each of the substrate layers can be preconditioned before being used in a fabrication process. For example, if the substrate is LTCC, the LTCC material can be baked at an appropriate temperature for a specified period of time or left to stand in a nitrogen dry box for a specified period of time. Common preconditioning cycles are 160° C. for 20–30 minutes or 24 hours in a nitrogen dry box. Both preconditioning processes are well known in the art of ceramic substrates.

Once the substrate layers 205 are preconditioned, a fluid channel 110 can be formed for carrying fluid through the control valve. In the arrangement shown, the fluid channel 110 extends from a left side 280 of the first substrate 105 to a right side 285 of the substrate layer 105, but the invention is not so limited and the fluid channel 110 can be oriented in any suitable manner. For example, in one arrangement the channels can be horizontally oriented so that one or more channels can be contained in a single substrate layer.

Prior to stacking the substrate layers 205, a fluid channel portion 210 can be formed in substrate layer 205-2, fluid channel portion 215 can be formed in substrate layer 205-3, fluid channel portion/cavity 220 can be formed in substrate layer 205-4, and fluid channel portion/cavity 225 can be formed in substrate layer 205-5. The fluid channels portions 210, 215, 220, 225 can be arranged so as to form one continuous fluid channel 110 once the substrate layers 205 are stacked. Additionally, the access port 115 can be formed in substrate layer 205-6, into which a lower portion 230 of the cap 120 can fit. In one arrangement, the thickness of the lower portion 230 is equal to the thickness of substrate layer 205-6. Many techniques are available for forming fluid channels and other openings in the substrate layers. For example, if the substrate layers 205 are ceramic, the fluid channels portions 210, 215, 220, 225 and access port 115 can be formed by mechanically punching channels or laser cutting channels into the substrate layers 205.

A first electrode 240 can be formed on an upper surface 245 of substrate layer 205-3 below a cavity 260 defined in the substrate 105. A second electrode 250 can be formed on a lower surface 255 of substrate layer 205-6 above the cavity 260. Accordingly, the cavity 260 can be defined between the electrodes 240, 250. The electrodes 240, 250 can be formed using processes which are known to the skilled artisan. For example, the electrodes 240, 250 can be formed using a conductive film deposited using conventional thick film screen printing process. The conductive material then can be dried in a box oven at an appropriate temperature and for an appropriate amount of time. For example, a common drying process is to bake the substrate having the conductive material at 160° C. for 5 minutes.

After the fluid channel portions 210, 215, 220, 225, access port 115, and electrodes 240, 250 are formed, the substrate layers 205 can be laminated together using an appropriate lamination method. In the case that the substrate layers 205 are LTCC, the substrate layers 205 can be stacked and hydraulically pressed with heated platens. For example, a uniaxial lamination method presses the substrate layers together at 3000 psi for 10 minutes using plates heated to 70° C. The substrate layers can be rotated 165° following the first 5 minutes. In an isotatic lamination process, the substrate layers are vacuum sealed in a plastic bag and then pressed using heated water. The time, temperature and pressure can be the same as those used in the uniaxial lamination process; however, rotation after 5 minutes is not required. Once laminated, the structure 105 can be fired inside a kiln on a flat tile. For example, the substrate layers can be baked between 200° C. and 500° C. for one hour and a peak temperature between 850° and 875° can be applied for greater than 15 minutes. After the firing process, post fire operations can be performed on the substrate layers.

Figure 3A:
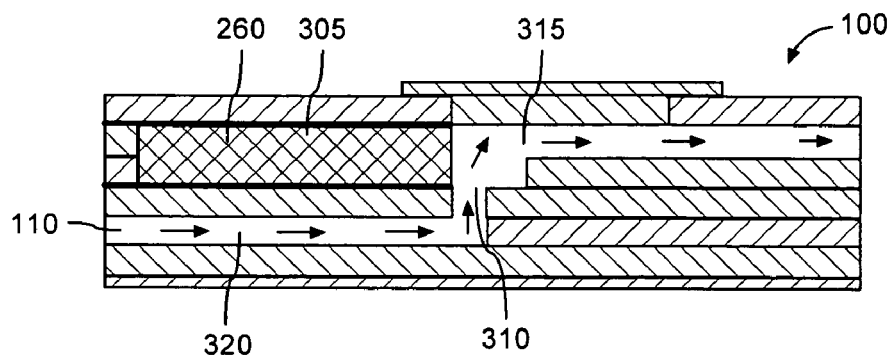
FIG. 3A is a section view, taken along section line 2—2, of the microfluidic control valve of FIG. 1 in a first operational state.

Once substrate processing is complete, an electroactive material 305 can be added to the cavity 260, as shown in FIG. 3A. An electroactive material is a material which responds to external electrical stimulation by displaying a shape or size displacement. Several types of electroactive materials are available for use with the present invention, for example, electroactive polymers (EAPs), electroactive ceramics (EACS) and shape memory alloys (SMAs). Generally, EAPs have the ability to induce strains that are as high as two orders of magnitude greater than the movements possible with EACs. In comparison to SMAs, EAP materials have higher response speeds, lower densities and improved resilience. In comparison to piezoelectric ceramics, EAPs can produce more than twice as much movement for the same energy input.

There are two major categories of EAPs, which differ in their mode of activation. These categories include electric EAPs and ionic EAPs. Members of the electric EAP category include ferroelectric polymers, dielectric EAPs, electrostrictive graft elastomers, electrostrictive paper, electro-viscoelastic elastomers and liquid crystal elastomer (LCE) materials. Members of the ionic EAP category include ionic polymer gel (IPG), ionomeric polymer-metal composites (IPMC), conductive polymers and carbon nanotubes. In general, ionic EAPs operate using lower voltages than electric EAPs, but have a slower displacement response. Thus, when selecting an electroactive material for use in the control valve described herein, the requirements of the intended application should be evaluated against the characteristics of the various electroactive materials that are available.

Suitable EAP materials are available from a number of companies. For example, a dielectric EAP that can be used as the electroactive material 305 is VHB™ acrylic foam tape available from the 3M™ Company of St. Paul, Minn. The VHB™ acrylic foam tape is available in a variety of thicknesses ranging from 15 mil to 120 mil. Another EAP material that can be used as the electroactive material 305 is model number CF19-2186 silicone elastomer, available from NuSil Technology of Carpinteria, Calif.

Although there currently are a number of types of electroactive material which expand when a voltage is applied across the material, there are also electroactive materials that constrict in the presence of an electric field. For example, the electroactive material can include carbon chains which have bond angles or bond lengths that decrease when a voltage is applied across the material. Such materials can comprise, for instance, polyacetylene.

If the silicone elastomer is used, as the electroactive material 305, it can be dispensed as a liquid into the cavity 260 and cured in place. For instance, CF19-2186 silicone elastomer can be injected into the cavity 260 and left to cure at room temperature for 24 hours. A mold release agent, for example Frekote® 1711 available from the Loctite Corporation of Rocky Hill, Conn., can be provided to minimize adhesion of silicone elastomer to the substrate layers. Frekote® 1711 can be applied as an aerosol spray and has a room temperature cure.

In an arrangement in which acrylic foam tape is used as the electroactive material 305, the access port 115 and lid 120 can extend over the cavity 260 to facilitate insertion of the acrylic foam tape into the cavity 260. In this case, at least a portion of the second electrode 250 can be disposed within the lid 120. Electrical contacts (not shown) can be provided to provide electrical continuity between the second electrode 250 and correlating circuit traces.

Figure 3B:
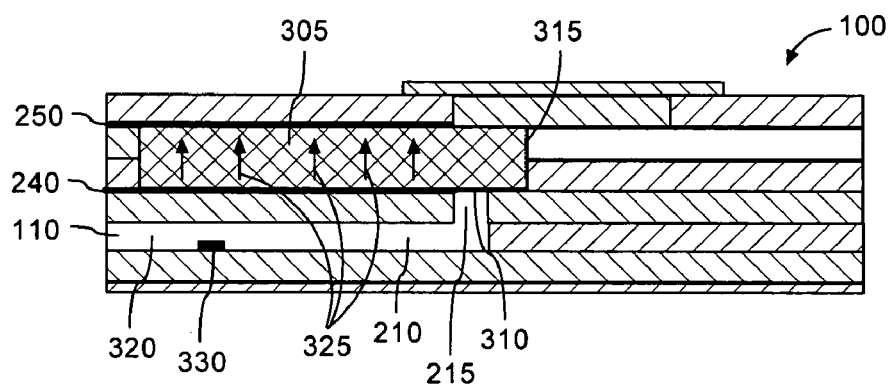
FIG. 3B is a section view, taken along section line 2—2, of the microfluidic control valve of FIG. 1 in a second operational state.

In FIG. 3A, the control valve 100 is shown in a first operational state in which the electroactive material 305 does not extend from the cavity 260, thus leaving fluid ports 310, 315 unobstructed. Accordingly, a fluid 320 can flow through the fluid channel 110. Referring to FIG. 3B, when a voltage is applied across the electrodes 240, 250, an electric field 325 can be generated through the electroactive material 305. The electric field 325 can cause the electroactive material 305 to change shape and extend at least partially over fluid port 310, thereby restricting the flow of fluid 320 through the fluid channel 110. In an alternate arrangement, the electroactive material 305 can normally extend over the fluid port 310 to restrict the flow of fluid 320, but constrict in the presence of the electric field 325 to uncover the fluid port 310 and allow the flow of fluid 320.

In one arrangement, the fluid channel portion 215 can comprise a plurality of fluid channel portions (not shown) extending through the substrate layer 205-3. Each of the plurality of fluid channels can have a cross sectional area that is smaller than a cross sectional area of fluid channel portion 210, while in congregate providing a total cross sectional area approximately equivalent to the fluid channel portion 210. Such an arrangement can be implemented to prevent the electroactive polymer 305 from binding on the fluid port 310 as the electroactive polymer 305 expands across the fluid port 310. In another arrangement, an insert (not shown) having multiple perforations can be disposed within the fluid channel portion 215. At this point it should be noted that although the fluid port 310 is shown as being located below the cavity 260, the invention is not so limited. For instance, the fluid port 310 can be located on a side of the cavity 260 or a top of the cavity 260.

The electroactive material 305 can extend to fluid port 315 and provide fluid flow restriction there as well. Thus, a fluidic seal can be provided at both fluid channels 310, 315. This arrangement provides redundancy in the control valve 100 for instances when it is desired that fluid flow be completely stopped through the fluid channel 110. Advantageously, this redundancy can be provided while utilizing a single moving component, namely the electroactive material 305.

A sensor 330 can be provided within the control valve 100 to control fluid flow through the fluid channel 110. For instance, the sensor 330 can be included in a closed loop control system which controls the rate of fluid flow. Such control systems are known to the skilled artisan. In one arrangement, the sensor 330 can be a fluid flow sensor located proximate to a fluid channel 110 to measure the flow of fluid 320 within the channel 110. In another arrangement, a sensor can be provided to measure voltage applied across the electrodes 240, 250, from which the amount of change in shape of the electroactive material 305 can be determined. In another arrangement, a sensor can be provided to directly measure the change in shape of the electroactive material 305. Still, there are a myriad of other sensors known to the skilled artisan that can be used to control the operation of the control valve, and thus the invention is not limited to the examples discussed herein.

Figure 4:
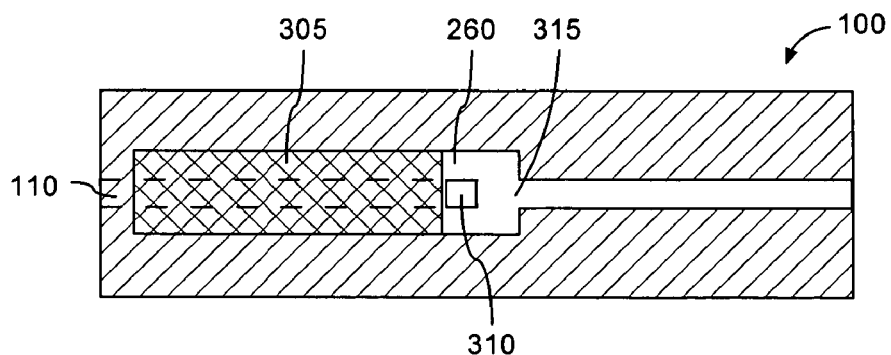
FIG. 4 is section view, taken along section line 3—3, of the microfluidic control valve of FIG. 1 in the first operational state.

FIG. 4 is section view, taken along section line 3—3, of the control valve 100 of FIG. 1. The section view presents the control valve 100 in the first operational state. As shown, the cavity 260 is wider than the fluid channel 110, but the invention is not so limited. For instance, the cavity 260 can have the same width as the fluid channel 110 or a smaller width than the fluid channel 110. All that is required is that in at least one operational state, the electroactive material 305 can restrict fluid flow through at least one of the ports 310, 315.

Figure 5:
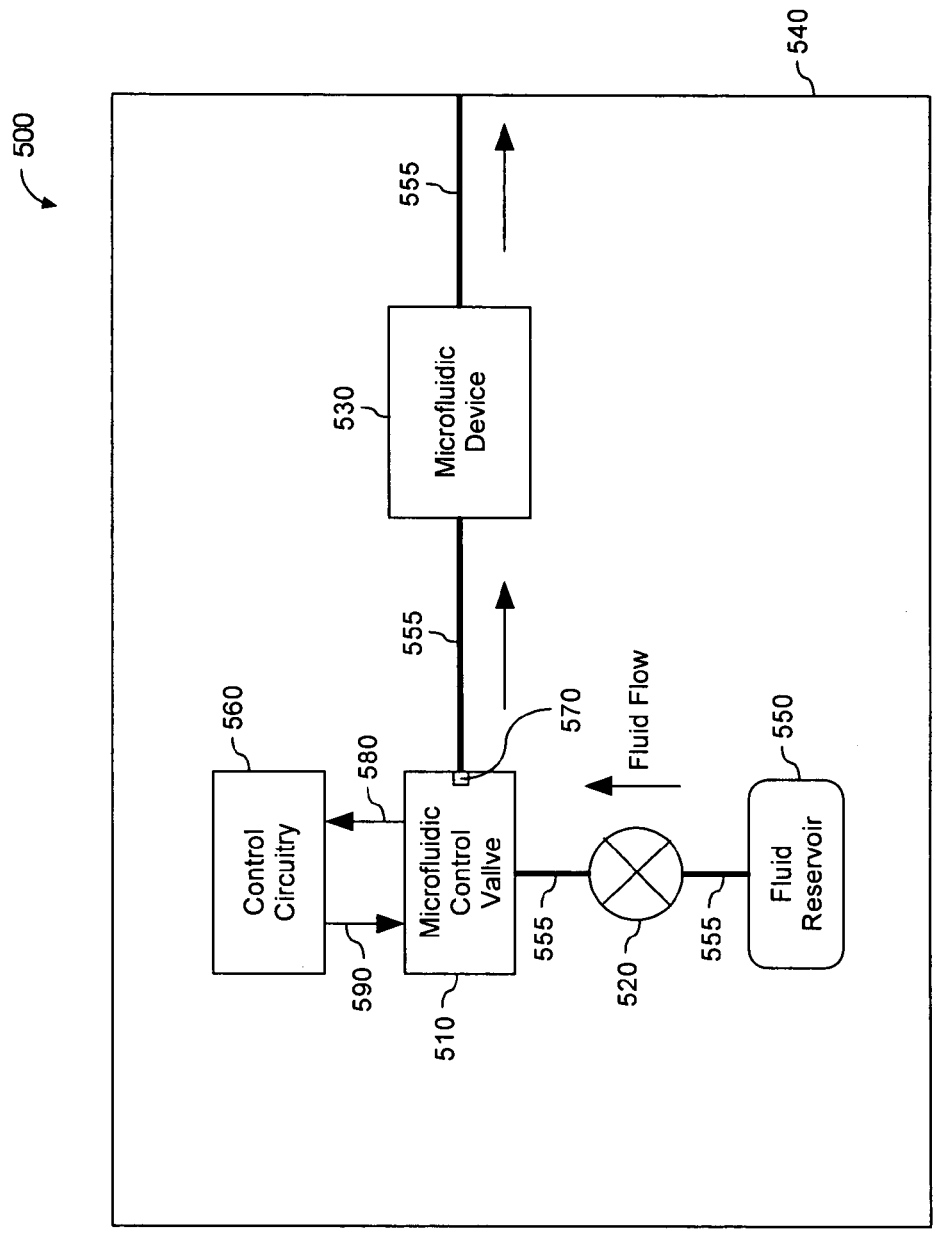
FIG. 5 is a schematic diagram of a fluidic system that is useful for understanding the present invention.

A fluidic system 500 that is useful for understanding the present invention is shown in FIG. 5. Examples of such systems can include fuel cells, micro-motors, and other MEMS type devices. Other examples can include fluid dielectric based devices in the RF field such as antenna elements, matching sections, delay lines, beam steering elements, tunable transmission lines, stubs and filters, variable attenuators, and cavity structures. Still, the invention is not limited to any particular type of system.

The fluidic system 500 can include a control valve 510 embedded in a substrate 540, a fluid pump 520 and a microfluidic device 530. Further, a fluid reservoir 550 can be provided. The fluid reservoir 550 can be embedded in the substrate 540 as shown, or be provided as a discrete unit. The control valve 510, the fluid pump 520, the microfluidic device 530 and the fluid reservoir 550 can be fluidically coupled via fluid channels 555, for example fluid channels within the substrate 540.

The fluidic system 500 also can include control circuitry 560, for example to provide a closed loop control circuit that controls operation of the control valve 510. The control circuitry 560 can receive fluid data 580 from a sensor 570 that measures fluid flow through the control valve 510. As noted, the sensor 570 can be contained within the control valve 510, but the invention is not so limited. For instance, the sensor can be external to the control valve 510. The control circuit 560 can process the fluid flow data 580 and generate one or more control signals 590 that are propagated to the control valve 510. For example, the control signal 590 can be a voltage potential that is applied across the electrodes of the control valve, thereby changing the shape of electroactive material within the control valve 510, as previously discussed.

Figure 6:
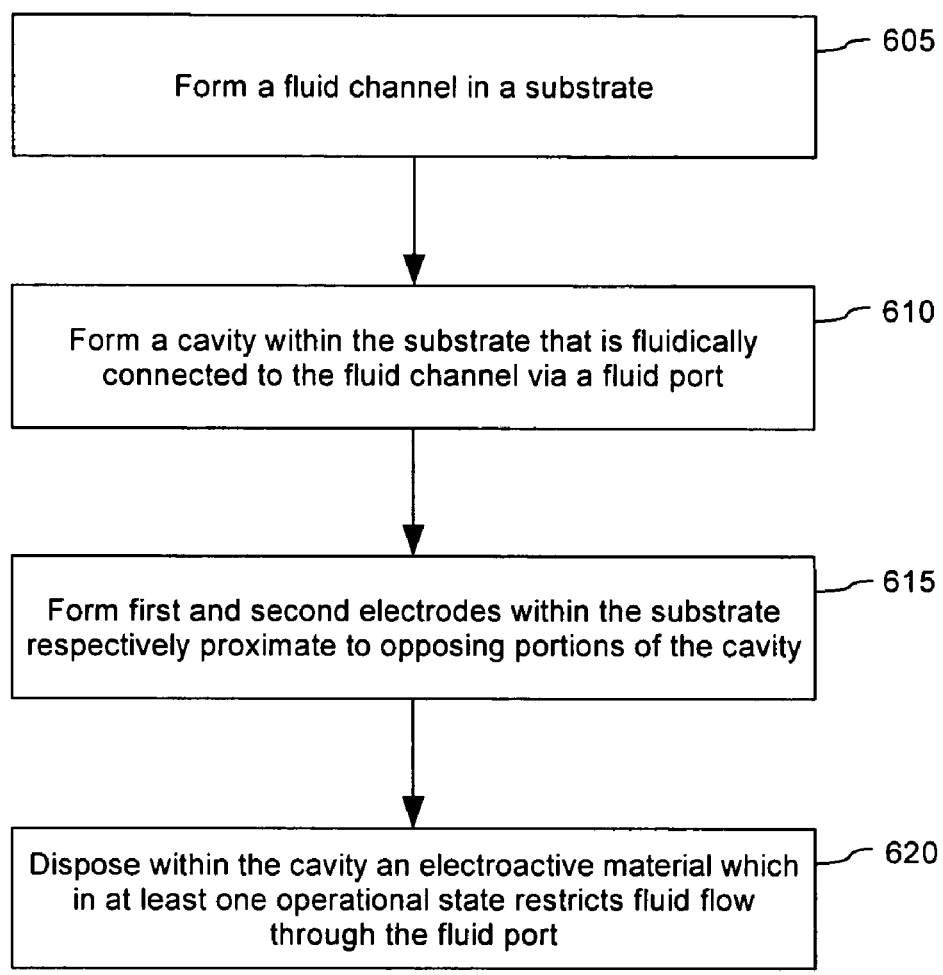
FIG. 6 is a flow chart that is useful for understanding the present invention.

A flow chart 600 which is useful for understanding the method of the present invention is shown in FIG. 6. Beginning at step 605, a fluid channel can be formed in a substrate. A cavity also can be formed within the substrate, as shown in step 610. The cavity can be fluidically connected to the fluid channel via a fluid port. Continuing at step 615, at least first and second electrodes can be formed within the substrate respectively proximate to opposing portions of the cavity. Proceeding to step 620, an electroactive material can be disposed within the cavity such that in one operational state the electroactive material can restrict fluid flow through the fluid port, thereby restricting fluid flow through the fluid channel.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

The invention claimed is:

1. A microfluidic control valve comprising:
   a dielectric structure defining at least one cavity therein;
   an electroactive material comprised of an electroactive polymer (EAP) disposed in a portion of said cavity, said electroactive material being operable between a first state in which a dimension of said electroactive material has a first value and a second state in which said dimension has a second value;
   at least two conductors for applying a voltage potential across said electroactive material, said application of said voltage potential changing said electroactive material between said first state and said second state;
   a closed loop control circuit configured to selectively vary said voltage potential responsive to at least one sensor and
   a first fluidic port located proximate to said electroactive material such that a fluid flows through said first fluidic port when said electroactive material is in at least one of said first and second state, and said electroactive material at least partially blocks said first fluidic port when said electroactive material is in at least one of said first and second state, thereby reducing or stopping said fluid flow.

2. The microfluidic control valve of claim 1 further comprising a second fluidic port fluidically coupled to said first fluidic port when said electroactive material is in at least one of said first and second state, and wherein said electroactive material forms a seal with each of said first and second fluidic port when said electroactive material is in at least one of said first and second state.

3. The microfluidic control valve of claim 1 wherein said at least one sensor is selected from the group consisting of an optical sensor, a fluid flow sensor and an electrical current sensor.

4. A method for controlling a fluid flow, comprising:
   flowing a fluid through a fluid port defining a cross-sectional area; and
   selectively varying an electric field applied to an electroactive material comprised of an electroactive polymer (EAP) in response to a control signal to produce a change in the cross-sectional area.

5. The method of claim 4 further comprising measuring the fluid flow and selectively varying the electric field responsive to the measured fluid flow.

6. The method of claim 4 further comprising measuring a change in shape of the electroactive material and selectively varying the electric field responsive to the measured change in shape.

7. A method for controlling a fluid flow, comprising:
   flowing a fluid through a fluid port defining a cross-sectional area;
   selectively varying an electric field applied to an electroactive material in response to a control signal to produce a change in the cross-sectional area; and measuring an intensity of the electric field and selectively varying the electric field responsive to the measured electric field intensity.

8. A method of fabricating a microfluidic control valve comprising:

forming at least one cavity in a dielectric structure;

disposing an electroactive material comprised of an electroactive polymer (EAP) in a portion of said cavity, said electroactive material being operable between a first state in which a dimension of said electroactive material has a first value and a second state in which said dimension has a second value;

disposing a first conductor on a first side of said electroactive material and disposing a second conductor on a second side of said electroactive material such that a voltage applied across said first and second conductors is applied across said electroactive material, thereby changing said electroactive material between said first state and said second state; awl providing a first fluidic port proximate to said electroactive material such that a fluid flows through said first fluidic port when said electroactive material is in at least one of said first and second state, and said electroactive material at least partially blocks said first fluidic port when said electroactive material is in at least one of said first and second state, thereby reducing or stopping said fluid flow; and selectively varying said voltage with a closed loop control circuit responsive to at least one sensor.

9. The method according to claim 8 further comprising providing a second fluidic port fluidically coupled to said first fluidic port when said electroactive material is in at least one of said first and second state, and forming with said electroactive material a seal with each of said first and second fluidic ports when said electroactive material is in at least one of said first and second state.

10. The method according to claim 8 further comprising selecting said at least one sensor from the group consisting of an optical sensor, a fluid flow sensor and an electrical current sensor.

11. A microfluidic control valve comprising:

a dielectric structure defining at least one cavity therein;

an electroactive material disposed in a portion of said cavity, said electroactive material being operable between a first state in which a dimension of said electroactive material has a first value and a second state in which said dimension has a second value;

at least two conductors for applying a voltage potential across said electroactive material, said application of said voltage potential changing said electroactive material between said first state and said second state;

a closed loop control circuit configured to selectively vary said voltage potential responsive to at least one sensor; and a first fluidic port formed in a first surface and a second fluidic port formed in a second surface distinct from said first surface, said first fluid port and said second fluid port located proximate to said electroactive material, said electroactive material configured to form a fluidic seal with said first and second surfaces when said electroactive material is in at least one of said first and second state, and unseating said fluidic seal with said first and second surfaces in one of said first and second state.

12. A microfluidic control valve for low temperature co-fired ceramic substrates comprising:

a substrate formed of a plurality of layers of low temperature co-fired ceramic:

at least one fluid flow channel formed within said substrate;

a cavity having at least one inlet fluid port coupled to said fluid flow channel; and an electroactive polymer disposed within said cavity, with at least one electrode coupled to said electroactive polymer for controlling a state of said electroactive polymer;

a sensor; and a control circuit selectively varying a voltage applied to said electroactive polymer responsive to said sensor.

13. The microfluidic control valve according to claim 12, further comprising an access port formed on a surface of said substrate, said access port forming an opening for accessing an interior of said cavity, and a lid covering said access port, said lid forming a liquid seal around a periphery of said access port.

* * * * *

UNITED STATES PATENT AND TRADEMARK OFFICE
CERTIFICATE OF CORRECTION

PATENT NO. : 7,168,680 B2  
APPLICATION NO. : 10/896652  
DATED : January 30, 2007  
INVENTOR(S) : Koeneman Page 1 of 1

It is certified that error appears in the above-identified patent and that said Letters Patent is hereby corrected as shown below:

Column 9  
Line 19, Claim 8, delete "awl" after "state;".

Column 10  
Line 18, Claim 11, delete "unseating" and replace with --unsealing--.

Signed and Sealed this

Second Day of October, 2007

JON W. DUDAS  
*Director of the United States Patent and Trademark Office*